United States Patent [19]

Sears

[11] Patent Number: 4,549,695
[45] Date of Patent: Oct. 29, 1985

[54] THRUST VECTOR CONTROL ACTUATOR

[75] Inventor: James T. Sears, Boulder, Colo.

[73] Assignee: Ball Corporation, Muncie, Ind.

[21] Appl. No.: 518,564

[22] Filed: Jul. 29, 1983

[51] Int. Cl.⁴ .............................................. F02K 9/84
[52] U.S. Cl. .................................. 239/265.35; 60/232
[58] Field of Search ........................ 239/265.35, 587; 60/232

[56] References Cited

U.S. PATENT DOCUMENTS

| 3,401,887 | 9/1968 | Sheppard | 60/232 |
| 3,436,021 | 4/1969 | Walton et al. | 239/587 |
| 3,659,788 | 5/1972 | Oldfield et al. | 60/232 |

*Primary Examiner*—Andres Kashnikow
*Assistant Examiner*—Scott D. Malpede
*Attorney, Agent, or Firm*—Gilbert E. Alberding

[57] ABSTRACT

A system is disclosed for moving a load from an equilibrium position to which it is urged by extraneous forces, with reduced power required of the motive system. In the system, a load is engaged by means storing potential energy when the load is in its equilibrium position and returning the potential energy to the load as it is moved from the equilibrium position. Such a nozzle-actuating system includes generally a frame, an electric motor drive, and a member, driven by the electric motor drive, that is movably carried by the frame and connected with the rocket nozzle. The frame and driven member can include a cam and spring arrangement to provide a force counteracting the force imposed on the driven member by the rocket nozzle when it is displaced from its normal position by the electric motor drive.

5 Claims, 6 Drawing Figures

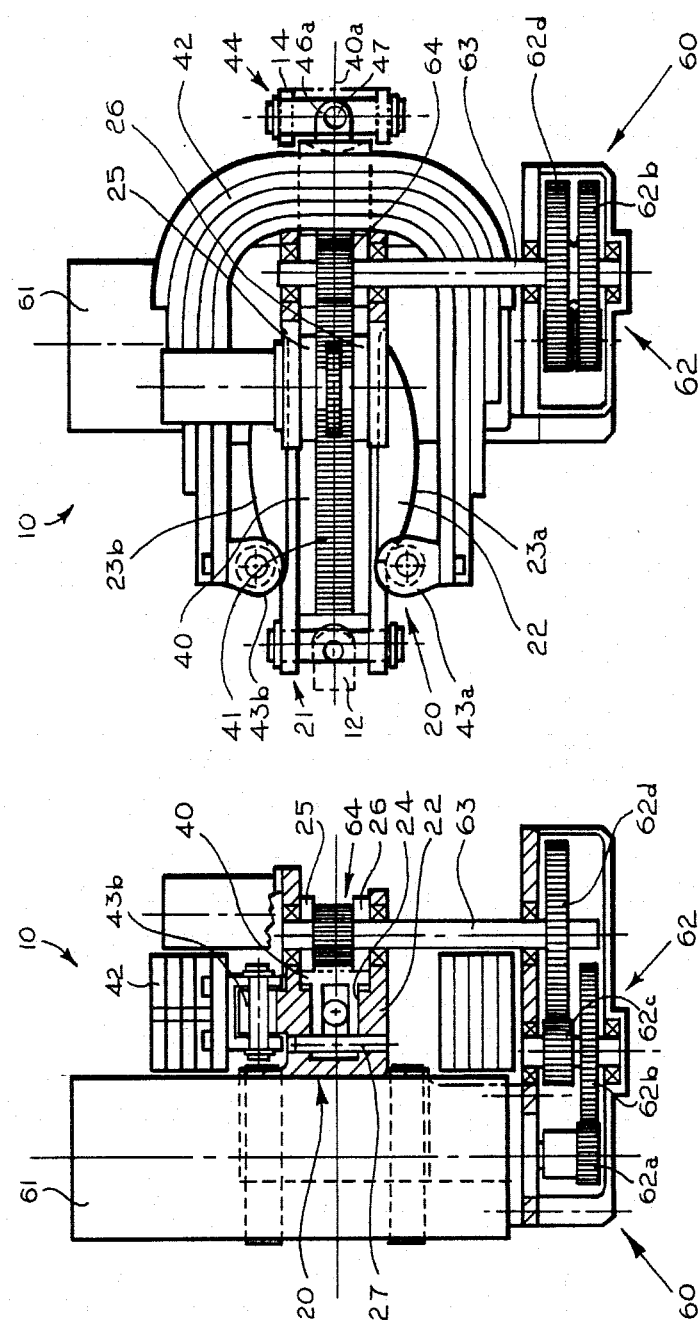

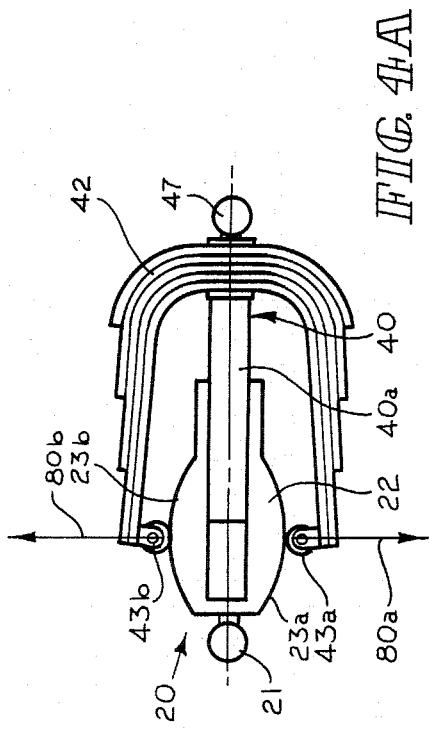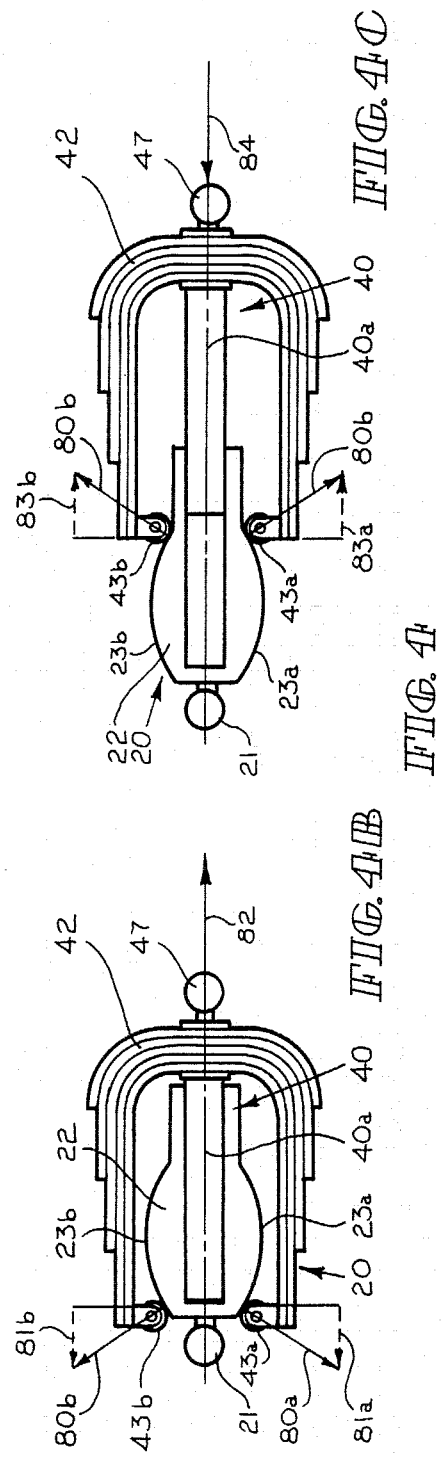

THRUST VECTOR CONTROL ACTUATOR

BACKGROUND OF THE INVENTION

This invention is directed to a system for moving load members from a position to which it is urged by an extraneous forces with reduced power, and more particularly to an electric drive system for a rocket nozzle which compensates for the forces imposed on the drive by displacement of the rocket nozzle.

Prior to this invention, rocket nozzle-actuating systems have generally used hydraulic pistons driven by turbine pumps and compressed air bottles. The long-term reliability of such systems is generally suspect; and after long-term storage, inspection and testing is frequently required to insure that the drive system is reliable. Such lack of reliability can stem from deterioration or unreliability of hydraulic system seals; bad hose connections and fittings; seepage of hydraulic fluid from the system; the loss of air pressure from compressed-air bottles; and other failures of hydraulic and pneumatic components.

SUMMARY OF THE INVENTION

In its broader aspects, this invention comprises a system for moving a load from an equilibrium position to which it is urged by extraneous forces, with reduced power required of the motive system. In such a system, the load is engaged by means storing potential energy when the load is in its equilibrium position and returning the potential energy to the load as it is moved from the equilibrium position.

This invention can also provide a reliable actuating system without the disadvantages of hydraulic system components in an electric system with components having substantially reduced deterioration with age and greater long-term reliability and providing lower cost and lower weight.

The nozzle-actuating system of this invention can include generally a frame, an electric motor drive, and a member, driven by the electric motor drive, that is movably carried by the frame and connected with the rocket nozzle. The frame and driven member include means to provide a force counteracting the force imposed on the driven member by the rocket nozzle when it is displaced from its normal position by the electric motor drive. Such means generally includes a cam follower and cam surface adapted to interact to provide such forces; and in its preferable form, the driven member can carry a U-shaped spring with one cam follower located on each end of the spring so that the force of the spring urges the cam followers together. The cam followers can engage two cam-shaped surfaces at the sides of the spring and resolve the force of the spring into a pair of force components, each counteracting the force imposed on the driven member by the rocket nozzle when it is displaced by the electric motor drive.

This system is more specifically shown and described in the following drawings and descriptions.

BRIEF DESCRIPTION OF THE DRAWINGS

FIG. 1 is a top plan view of a system of the invention;

FIG. 2 is a plan view of the system from the left of FIG. 1;

FIGS. 4A, 4B, and 4C are a set of diagrammatic drawings illustrating how the system of FIGS. 1, 2, and 3 produces forces counteracting the force imposed on the system by a displaced rocket nozzle.

DETAILED DESCRIPTION OF THE PREFERRED EMBODIMENTS

Figure 3:
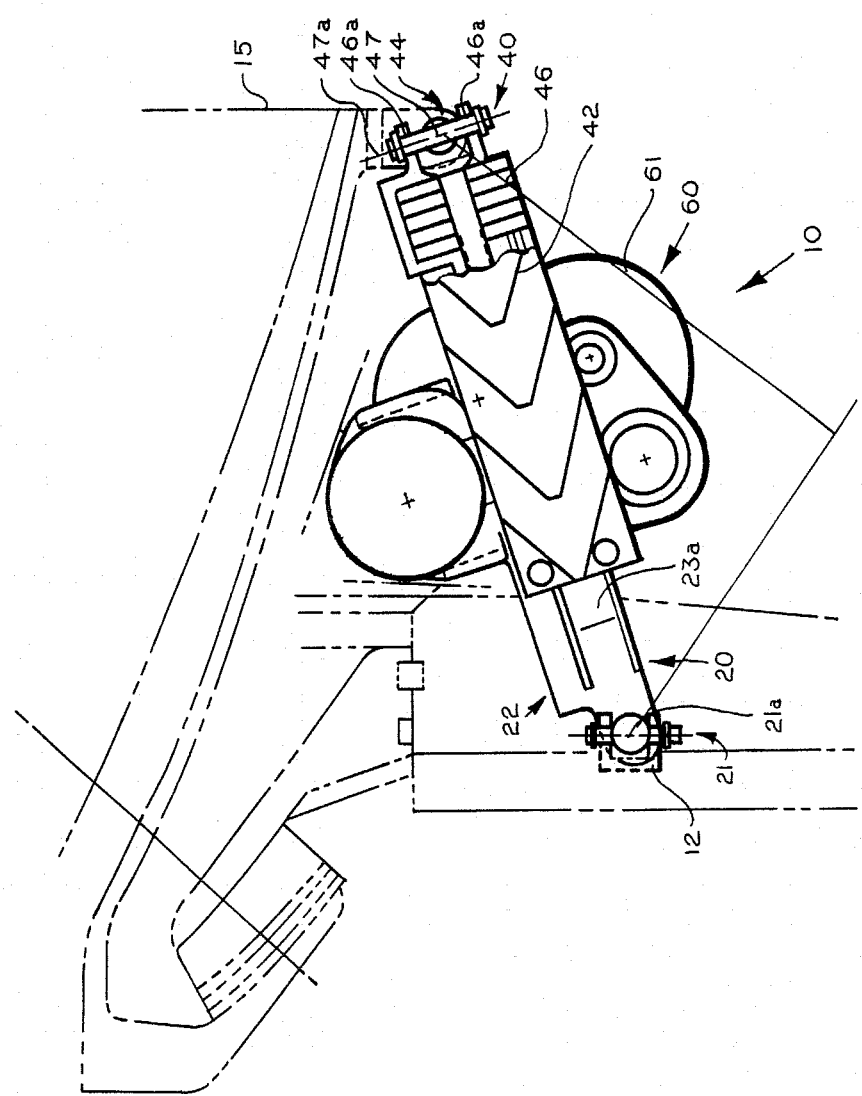
FIG. 3 is a plan view from the side of the system of FIGS. 1 and 2, illustrating the manner of its installation into a rocket system.

Referring now to FIG. 1, the system 1P0 of this invention concludes generally a frame 20, a driven member 40 and an electric motor drive 60. The frame 20 is adapted at one end 21 for pivotal mounting to a superstructure 12, shown in phantom lines in FIGS. 1 and 3. The frame 20 includes a central portion 22 which carries the driven member 40.

As shown in FIGS. 1 and 2, a driven member 40 is slidably journaled within the central portion 22 of frame 20 and is guided and supported in its movement along the axis 40a of the system by the central portion 22 of frame 20. The driven member includes a rack gear 41 on its upper surface, as shown in FIGS. 1 and 2. The rack gear 41 of the driven member 40 is connected with the electric drive 60 by a pinion gear 64 in a manner to be described below. The driven member 40 is constrained in a channel 24 formed in the frame 20 by a set of rollers 25 and 26 on each side of rack gear 41 and by rollers 27 under the driven member 40. The rollers 25, 26, and 27 maintain the proper spacing relationship between the rack gear 41 and its driving pinion gear 64.

Also carried by the driven member 40 is a U-shaped leaf spring 42 having mounted at the opening of the U a pair of rollers 43a and 43b. The pair of rollers comprises a cam follower which is adapted to interact with stationary cam surfaces of the system to provide a force acting on the driven member 40 to counteract the forces imposed on the driven member 40 by a displaced rocket nozzle. The end 44 of the driven member 40 opposite the end 21 of the frame adapted for pivotal connection, is itself adapted for pivotal connection to the rocket nozzle. The driven member includes a portion 46 extending outwardly to form a clevis 46a carrying a pin 47 adapted to be interconnected with a portion 14 of the rocket nozzle. The design of such a slidable support of the driven member 40 by the frame 20 is well-known to those skilled in the art.

As shown from FIG. 1, the outer surfaces 23a and 23b of the central portion 22 of the frame form two arcuate portions which bulge outwardly away from the central axis 40a along which driven member 40 moves. The arcuate surfaces 23a and 23b of frame 20 form a cam surface against which the cam follower formed by rollers 43a and 43b are urged by spring 42. The cam follower/cam surface means of this invention resolves the forces imposed on the cam follower 43 by spring 42 into a force on the driven member 40 which counteracts the forces imposed on cam follower 40 by the connection 14 of the rocket nozzle in its displacement by system 10.

The electric drive 60 includes, preferably, a direct current electric motor 61 and a gear reducer 62 including a plurality of gears 62a, 62b, 62c, and 62d. The output of the gear reducer 62 drives a shaft 63 and pinion gear 64 which is engaged with rack gear 41. As apparent from FIG. 1, the output of the electric motor 61 through gear reducer 62 and drive shaft 63 rotates pinion gear 64 which, through its engagement with rack gear 41, drives the driven member 40 along the axis 40a running from left to right, as shown in FIG. 1.

When the system 10 is installed, for example, to drive or to direct a rocket nozzle, the output of motor 61 drives driven member 40 and pin 47 to left or right as shown in FIG. 3, thereby increasing or decreasing the length of the system between point 21a, which is the center of pivotal connection of the frame, and the center 47a, which is the center of the linking pin adapted for connection in the rocket nozzle. As shown in FIG. 3, the system 10 is at its central or rest position; and as the driven member 40 is driven outwardly (or to the right as shown in FIG. 3), it will push the rocket motor to the right of center line 15 (FIG. 3). As the driven member 40 is moved inwardly toward the frame (or to the left as shown in FIG. 3), it will draw the rocket motor to the left of its center line 15. The normal system is such that gravity and other forces acting on the rocket nozzle want to move it back to the center line 15. The system of the invention, through its cam follower/cam surface means, provides forces acting on the driven element 40 which tends to counteract the forces imposed on pin 47 by the rocket nozzle.

The action of the preferred system of this invention may be more clearly understood by referring to FIGS. 1 and 4A-C. FIG. 4A represents the system of this invention in its central or rest position (shown in FIG. 3). FIG. 4B shows the system of this invention with the driven member 40 fully withdrawn in the frame 20 (corresponding with position of FIGS. 1 and 2). In the position of FIG. 4B, the system will have drawn the rocket nozzle to the left of the center line 15 of FIG. 3. FIG. 4C shows the system of this invention with the driven member 40 fully extended from the frame 20. In the position of FIG. 4C, the system of this invention would have moved a rocket nozzle to the right of the center line 15 of FIG. 3.

FIGS. 4A-C illustrate the interaction of the cam followers 43a and 43b, carried by the driven member 40, and the cam surfaces 23a and 23b formed by the central portion 22 of frame 20. Referring to FIG. 4A, in its central or rest position, the spring 42, which tends to urge cam followers 43a and 43b together and against the cam surfaces 23a and 23b, bears upon portions of the cam surfaces 23a and 23b which lie tangent to lines parallel to the central axis 40a along which member 40 is driven; and the resolved force of the spring 80a and 80b is balanced and imposes no force component acting along axis 40a.

As a driven member 40 is drawn into frame 20 as shown in FIG. 4B, the cam followers 43a and 43b are urged by spring 42 against portions of the cam surfaces 23a and 23b that resolve the force of the spring 80a and 80b into force components 81a and 81b that oppose force 82 imposed on movable element 40 by the rocket nozzle.

Referring to FIG. 4c, when the driven element 40 is fully extended, the cam follower formed by 43a and 43b bearing on the cam surfaces 23a and 23b to resolve the forces 80a and 80b imposed by the spring 42 into force components 83a and 83b that oppose the force 84 imposed on driven element 40 by the rocket nozzle.

Thus the system of this invention can move a load with less power expenditure. The load which is attached to pin 47 is urged to its vertical equilibrium position, shown by center line 15, by gravity or other extraneous forces such as springs or other attached paraphernalia. The system includes means 20, 42 which are adapted to store potential energy (for example, in the stress of spring 42 through cams 23a and 23b) when the load is in its equilibrium position and to return that potential energy to the load as the load is moved from its equilibrium position by the motive system 60.

The system also generates forces balancing the force imposed on it by the rocket nozzle as it is displaced from its central position, provides a light-weight, low-cost, electrically driven system to direct a rocket nozzle, and provides improved reliability over the previously used hydraulic systems.

Other specific embodiments may be devised without departing from the scope of the following claims.

I claim:

1. A system for the manipulation of a rocket nozzle, comprising:
   a frame adapted for pivoted mounting at one end,
   an electric motor drive and gear reducer carried by the frame,
   a pinion gear on the output of the gear reducer,
   a driven member slidably journaled by the frame and including a rack gear engaged by the pinion gear and a connection adapted for pivotal connection to the rocket beyond the nozzle frame,
   a U-shaped spring and pair of cam followers carried by the driven member, one cam follower being located at each end of the spring at each side of the opening of the U-shaped spring, the force of the spring urging the cam followers together,
   said frame forming two cam-shaped sides, one on each side of the driven member,
   said cam followers of the U-shaped spring carried by the driven member being engaged with the two cam-shaped sides of the frame, the cam shaped sides and their interaction with the cam followers resolving the force of the spring into a pair of components acting the driven member to counteract the force imposed on the driven member at the connection by the rocket nozzle.

2. The system of claim 1 wherein the cam-shaped sides are two symmetrical arcuate portions that bulge outwardly from the central axis along which the driven member moves.

3. A system for directing the nozzle of a rocket, comprising:
   a frame,
   an electric motor drive, and
   a driven member connected with the rocket nozzle, said driven member being movably carried by the frame and driven by the electric motor drive, said frame and driven member including means adapted to interact and to provide a force counteracting the force imposed on the driven member by the rocket nozzle when it is displaced by the electric motor drive.

4. The system of claim 3 wherein the driven member is slidably carried by the frame and carries a cam follower on each side of the driven member, the cam followers being spring-loaded and engaging a pair of cam surfaces on the frame to resolve the spring loading of the cam followers into a pair of force components acting on the driven member.

5. A system of claim 4 wherein the frame is adapted for pivoted mounting at one end, the driven member carries a U-shaped spring, one cam follower being located at each end of the spring at each side of the opening of the U-shaped spring, the force of the spring urging the cam followers together, said cam followers of the U-shaped spring carried by the driven members being engaged with the two cam-shaped sides of the frame.

* * * * *